(12) United States Patent
Lin

(10) Patent No.: US 7,826,138 B2
(45) Date of Patent: Nov. 2, 2010

(54) DICHROIC MIRROR

(75) Inventor: Juin-Hong Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 448 days.

(21) Appl. No.: 12/100,278

(22) Filed: Apr. 9, 2008

(65) Prior Publication Data

US 2009/0122408 A1    May 14, 2009

(30) Foreign Application Priority Data

Nov. 9, 2007    (CN) .................. 2007 1 0202455

(51) Int. Cl.
*G02B 1/10*    (2006.01)
*G02B 27/14*    (2006.01)

(52) U.S. Cl. ............... 359/584; 359/586; 359/589; 359/634

(58) Field of Classification Search ............ 359/584, 359/586, 587, 588, 589, 634
See application file for complete search history.

(56) References Cited

U.S. PATENT DOCUMENTS 6,611,378 B1 *    8/2003    Wang et al. ............ 359/588
6,631,033 B1 *    10/2003    Lewis .................... 359/584
7,333,266 B2 *    2/2008    Shang .................... 359/584
7,697,209 B2 *    4/2010    Lin ........................ 359/634

FOREIGN PATENT DOCUMENTS

CN    1828345 A    9/2006

* cited by examiner

*Primary Examiner*—Audrey Y Chang
(74) *Attorney, Agent, or Firm*—Andrew C. Cheng

(57) ABSTRACT

A dichroic mirror includes a substrate, a first film stack, and a second film stack. The first film stack is deposed on the substrate and has a structure represented by a first formula: $(2HL)^n$. The second film stack is deposed on the first film stack and has a structure represented by a second formula: $(0.325H0.65L0.325H)^m$. '2HL' and '0.325H0.65L0.325H' respectively represent a double-layer sub-structure of the first film stack and a sandwiched sub-structure of the second film stack, and 'n' and 'm', which are integers, respectively represent the number of repetitions of the double-layer sub-structures and sandwiched sub-structures 'H' and 'L' respectively represent a high refractive index layer and a low refractive index layer, both of which have a height equal to ¼ of the reference wavelength of the dichroic mirror, and '2', '0.325' and '0.65' are height coefficients.

11 Claims, 3 Drawing Sheets

DICHROIC MIRROR

TECHNICAL FIELD

The present invention relates to dichroic mirrors and, particularly, to a dichroic mirror used in a projection device for separating non-polarized light.

DESCRIPTION OF RELATED ART

Generally, a dichroic mirror for separating non-polarized light into, for example, green and blue lights, typically includes a substrate and a coating. The structure of the coating can be typically represented by the formula: $(0.5HL0.5H)^\mu$, wherein '0.5HL0.5H' represents a sandwiched sub-structure of the coating, and '$\mu$', which is an integer, represents the number of repetitions of the sandwiched sub-structures. In particular, 'H' represents a high refractive index layer and 'L' represents a low refractive index layer, both of which have a height equal to ¼ of the reference wavelength of the dichroic mirror, and '0.5' is a height coefficient.

Referring to FIG. 3, obviously, non-polarized light has a wider reflected S-polarized component wavelength range than a reflected P-polarized component wavelength range, when it is separated by the dichroic mirror. That is, the reflection characteristics of the dichroic mirror have high polarization dependency. Therefore, if such a dichroic mirror is used in a projection device for separating non-polarized light (emitted from, for example, a light emitting diode), brightness and contrast of the projection device suffer.

What is needed, therefore, is a dichroic mirror for separating non-polarized light that can overcome the above-described shortcoming.

SUMMARY

A dichroic mirror is disclosed. The dichroic mirror includes a substrate, a first film stack, and a second film stack. The first film stack is deposed on the substrate and has a structure represented by a first formula: $(2HL)^n$. The second film stack is deposed on the first film stack and has a structure represented by a second formula: $(0.325H0.65L0.325H)^m$. '2HL' and '0.325H0.65L0.325H' respectively represent a double-layer sub-structure of the first film stack and a sandwiched sub-structure of the second film stack, 'n' and 'm', which are integers, respectively represent the number of double-layer sub-structures and the number of sandwiched sub-structures, 'H' and 'L' respectively represent a high refractive index layer and a low refractive index layer, both of which have a height equal to ¼ of the reference wavelength of the dichroic mirror, and '2', '0.325' and '0.65' are height coefficients.

BRIEF DESCRIPTION OF THE DRAWINGS

Many aspects of the present dichroic mirror can be better understood with reference to the following drawings. The components in the drawing are not necessarily drawn to scale, the emphasis instead being placed upon clearly illustrating the principles of the present dichroic mirror.

DETAILED DESCRIPTION OF THE EMBODIMENTS

Embodiments of the present dichroic mirror will now be described in detail below, with reference to the drawings.

Figure 1:
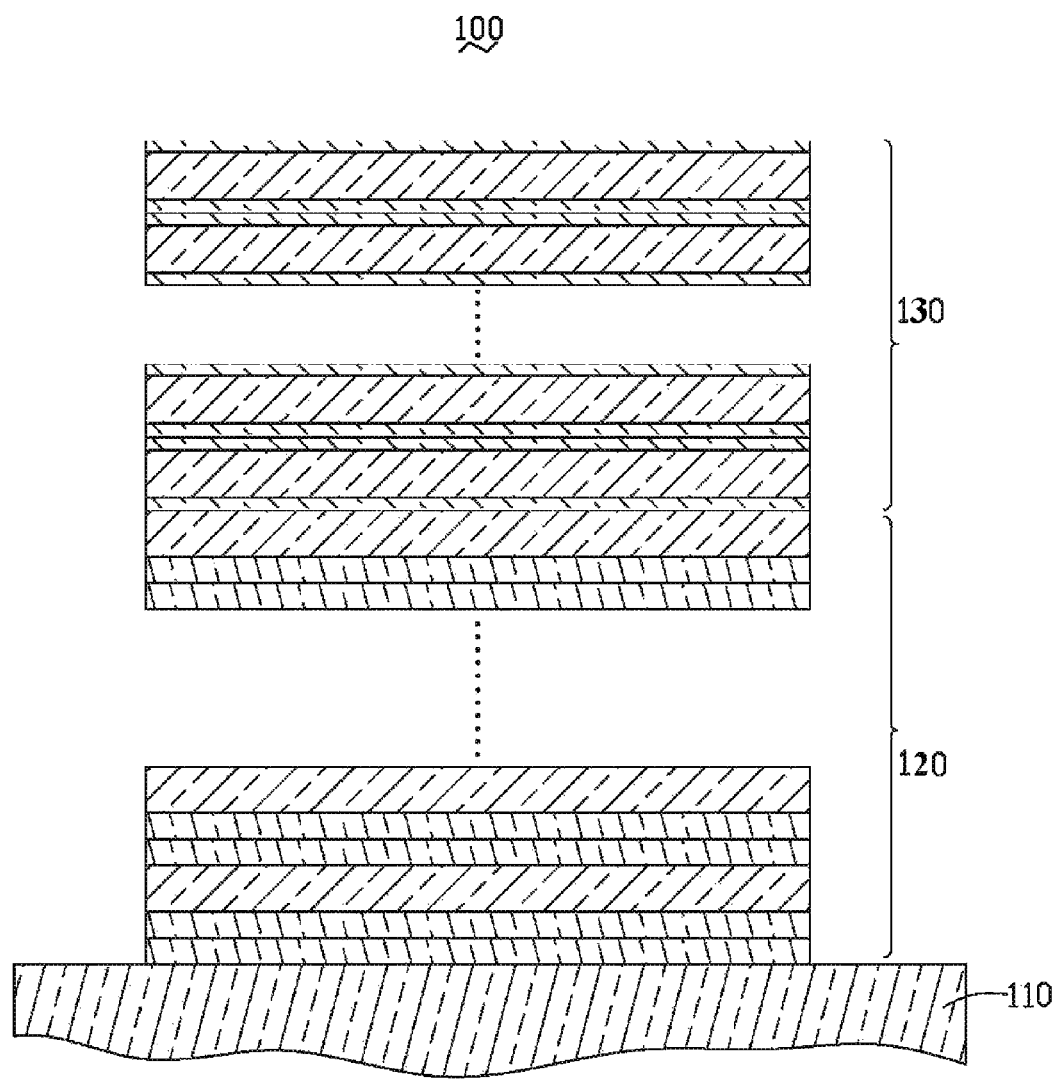
FIG. 1 is a cross-sectional, schematic view of a dichroic mirror, according to an exemplary embodiment.

Referring to FIG. 1, a dichroic mirror 100 for use in a projection device, according to an exemplary embodiment, includes a substrate 110, a first film stack 120, and a second film stack 130. The first film stack 120 is deposed on the substrate 110, and the second film stack 130 is deposed on the second film stack 120. The substrate 110 is made of a transparent material.

The structure of the first film stack 120 can be represented by a first formula: $(2HL)^n$, wherein '2HL' represents a double-layer sub-structure of the first film stack 120, and 'n', which is an integer, represents the number of repetitions of the double-layer sub-structures. In particular, 'H' represents a high refractive index layer and 'L' represents a low refractive index layer, both of which have a height equal to ¼ of the reference wavelength of the dichroic mirror 100, and '2' is a height coefficient. The structure of the second film stack 130 can be represented by a second formula: $(0.325H0.65L0.325H)^m$, wherein '0.325H0.65L0.325H' represents a sandwiched sub-structure of the second film stack 130, 'm', which is an integer, represents the number of repetitions of the sandwiched sub-structures and '0.325' and '0.65' are height coefficients. The reference wavelength is in a range from 500 nm to 700 nm. The value of the n and m is in a range from 7 to 14.

In this embodiment, the reference wavelength is 630 nm, n=10 (the first film stack 120 is represented by the first formula: $(2HL)^{10}$), and m=10 (the second film stack 130 is represented by the second formula: $(0.325H0.65L0.325H)^{10}$).

The high refractive index layer H can be made of a high refractive index material selected from a group consisting of $TiO_2$, $Ta_2O_5$, and $Nb_2O_5$, and the refractive index thereof is in a range from 2.0 to 2.5. The low refractive index layer L can be made of a low refractive material selected from a group consisting of $MgF_2$ and $SiO_2$, and the refractive index thereof is in a range from 1.4 to 1.5.

Figure 2:
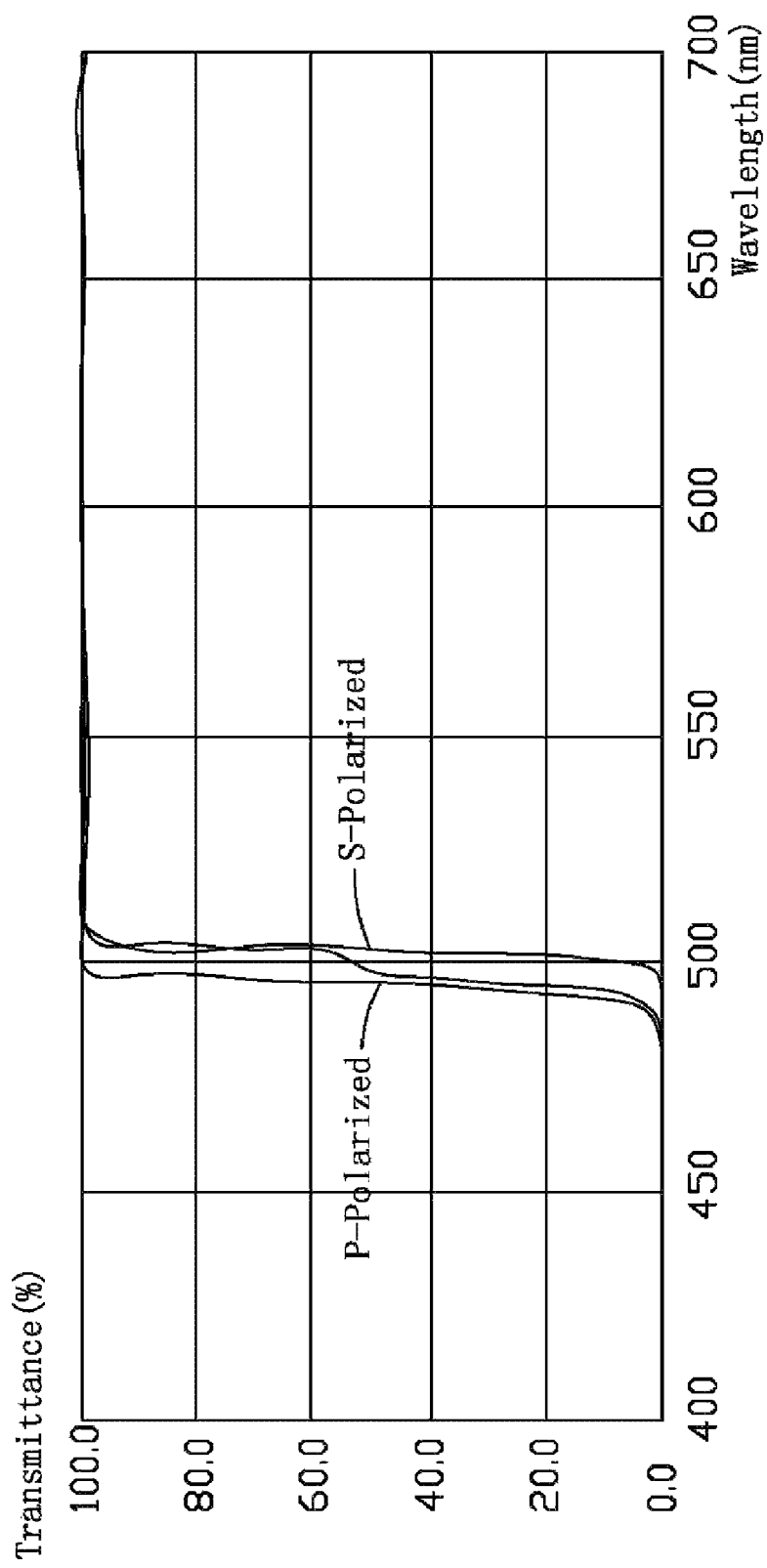
FIG. 2 is a graph showing spectral transmittance characteristics of the dichroic mirror, according to the exemplary embodiment.
Figure 3:
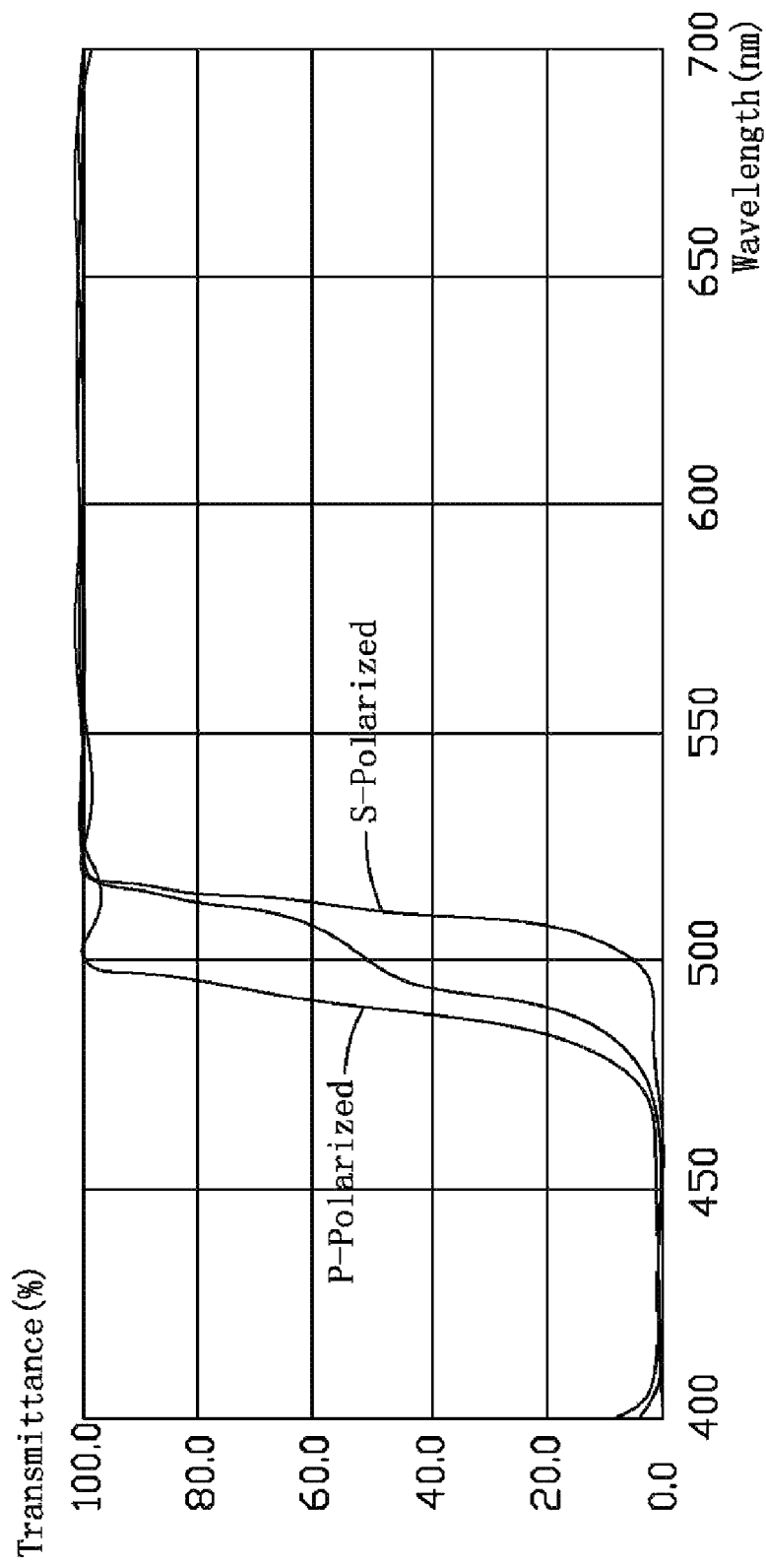
FIG. 3 is a graph showing spectral transmittance characteristics of a dichroic mirror, according to related art.

Referring to FIG. 2, a graph shows spectral transmittance characteristics of the dichroic mirror 100 according to the exemplary example. As shown in FIG. 2, the reflected S-polarized component wavelength range is essentially similar to the reflected P-polarized component wavelength range (that is, polarization dependency is improved), resulting in improved contrast and brightness.

Therefore, the curve of wavelength of P-polarized light is closer to that of S-polarized light, thus enhancing reflectivity of blue light.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A dichroic mirror for a projection device comprising:
   a substrate;
   a first film stack deposed on the substrate and having a structure represented by a first formula: $(2HL)^n$; and
   a second film stack deposed on the first film stack and having a structure represented by a second formula: $(0.325H0.65L0.325H)^m$;

wherein '2HL' and '0.325H0.65L0.325H' respectively represent a double-layer sub-structure of the first film stack and a sandwiched sub-structure of the second film stack, 'n' and 'm', which are integers, respectively represent the number of repetitions of the double-layer sub-structures and sandwiched sub-structures, 'H' and 'L' respectively represent a high refractive index layer and a low refractive index layer, both of which have a height equal to ¼ of a reference wavelength of the dichroic mirror, and '2', '0.325' and '0.65' are height coefficients.

2. The dichroic mirror as claimed in claim 1, wherein n ranges from 7 to 14.

3. The dichroic mirror as claimed in claim 1, wherein n=10.

4. The dichroic mirror as claimed in claim 1, wherein m ranges from 7 to 14.

5. The dichroic mirror as claimed in claim 1, wherein m=10.

6. The dichroic mirror as claimed in claim 1, wherein the high refractive index layer is made of a high refractive index material selected from a group consisting of $TiO_2$, $Ta_2O_5$, and $Nb_2O_5$.

7. The dichroic mirror as claimed in claim 1, wherein the refractive index of the high refractive index material is in a range from 2.0 to 2.5.

8. The dichroic mirror as claimed in claim 1, wherein the low refractive index layer is made of a low refractive index material selected from a group consisting of $MgF_2$ and $SiO_2$.

9. The dichroic mirror as claimed in claim 1, wherein the refractive index of the low refractive index material is in a range from 1.4 to 1.5.

10. The dichroic mirror as claimed in claim 1, wherein the reference wavelength is in a range from 500 nm to 700 nm.

11. The dichroic mirror as claimed in claim 1, wherein the reference wavelength is substantially equal to 630 nm.

* * * * *